(12) United States Patent
Imai

(10) Patent No.: US 11,526,468 B2
(45) Date of Patent: Dec. 13, 2022

(54) MANAGEMENT SYSTEM AND CONTROL METHOD

(71) Applicant: CANON KABUSHIKI KAISHA, Tokyo (JP)

(72) Inventor: Kazuo Imai, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 793 days.

(21) Appl. No.: 15/435,115

(22) Filed: Feb. 16, 2017

(65) Prior Publication Data

US 2017/0242866 A1 Aug. 24, 2017

(30) Foreign Application Priority Data

Feb. 23, 2016 (JP) .............................. JP2016-032474

(51) Int. Cl.
| | | |
|---|---|---|
| *G06F 16/00* | (2019.01) | |
| *G06F 16/16* | (2019.01) | |
| *G06F 8/61* | (2018.01) | |
| *G06F 9/455* | (2018.01) | |
| *G06F 16/11* | (2019.01) | |

(52) U.S. Cl.
CPC .............. *G06F 16/162* (2019.01); *G06F 8/62* (2013.01); *G06F 9/45533* (2013.01); *G06F 8/63* (2013.01); *G06F 16/128* (2019.01)

(58) Field of Classification Search
CPC .. G06F 17/30117; G06F 8/62; G06F 9/45533; G06F 8/63; G06F 16/162; G06F 16/128
See application file for complete search history.

(56) References Cited

U.S. PATENT DOCUMENTS

| 8,711,412 | B2* | 4/2014 | Tokumoto | ........... | G06F 11/1433 |
|---|---|---|---|---|---|
| | | | | | 358/1.15 |
| 8,860,957 | B2* | 10/2014 | Akuzawa | ............... | G06K 15/00 |
| | | | | | 358/1.11 |
| 9,742,873 | B2* | 8/2017 | Ananthanarayanan | ..................... | |
| | | | | | G06F 9/5072 |
| 11,144,398 | B2* | 10/2021 | Wilding | ................ | G06F 9/5077 |
| 2008/0201414 | A1* | 8/2008 | Amir Husain | ........ | G06F 9/5077 |
| | | | | | 709/203 |
| 2012/0072388 | A1* | 3/2012 | Ueda | ........................ | G06F 8/63 |
| | | | | | 706/52 |
| 2013/0046585 | A1* | 2/2013 | Bang | ........................ | G06F 8/20 |
| | | | | | 717/103 |

(Continued)

FOREIGN PATENT DOCUMENTS

| JP | 2003-271390 A | 9/2003 |
|---|---|---|
| JP | 2005-332223 A | 12/2005 |

(Continued)

*Primary Examiner* — Hasanul Mobin
(74) *Attorney, Agent, or Firm* — Canon U.S.A., Inc. IP Division

(57) ABSTRACT

A management system gives an instruction to assign a value of an attribute corresponding to an environment where a processing system including a virtual machine started using a system image file is constructed, to the system image file, determines, based on a condition according to the value of the attribute assigned to the system image file in response to the instruction, whether the system image file is to be deleted, and gives an instruction to delete, from a storage device, the system image file that has been determined to be deleted.

15 Claims, 18 Drawing Sheets

(56) References Cited

U.S. PATENT DOCUMENTS

| | | | | |
|---|---|---|---|---|
| 2013/0185716 A1* | 7/2013 | Yin | ............... | H04L 67/1097 |
| | | | | 718/1 |
| 2013/0238675 A1* | 9/2013 | Tomioka | ............... | G06F 8/63 |
| | | | | 707/827 |
| 2014/0040656 A1* | 2/2014 | Ho | ............... | G06F 8/61 |
| | | | | 718/1 |
| 2014/0068042 A1* | 3/2014 | Mungi | ............... | G06F 8/63 |
| | | | | 709/223 |
| 2014/0146055 A1* | 5/2014 | Bala | ............... | G06F 9/45558 |
| | | | | 345/501 |
| 2014/0317148 A1* | 10/2014 | Branson | ............... | G06F 9/5083 |
| | | | | 707/798 |
| 2017/0109187 A1* | 4/2017 | Cropper | ............... | G06F 1/3234 |
| 2017/0177877 A1* | 6/2017 | Suarez | ............... | G06F 16/2455 |

FOREIGN PATENT DOCUMENTS

| | | |
|---|---|---|
| JP | 2007-052666 A | 3/2007 |
| WO | 2015/083255 A1 | 6/2015 |

* cited by examiner

FIG. 6

| CURRENT TAG | TAG TO WHICH CURRENT TAG CAN BE UPDATED | | |
|---|---|---|---|
| TR | TS | --- | --- |
| TS | PRV | DEM | RH |
| PRV | DEM | RH | --- |
| DEM | PRV | RH | --- |
| RH | PRD | --- | --- |
| PRD | --- | --- | --- |

601 — CURRENT TAG
602 — TAG TO WHICH CURRENT TAG CAN BE UPDATED
611, 612, 613, 614, 615, 616

FIG. 9

| TAG | DELETION CONDITION |
|---|---|
| TR | DELETE SYSTEM IMAGE FILE AFTER LAPSE OF 3 DAYS OR MORE SINCE CREATION |
| TS | DELETE SYSTEM IMAGE FILE AFTER LAPSE OF 15 DAYS OR MORE SINCE CREATION |
| PRV | DELETE SYSTEM IMAGE FILE AFTER LAPSE OF 30 DAYS OR MORE SINCE CREATION |
| DEM | DELETE SYSTEM IMAGE FILE AFTER LAPSE OF 30 DAYS OR MORE SINCE CREATION |
| RH | DELETE SYSTEM IMAGE FILE AFTER LAPSE OF 60 DAYS OR MORE SINCE CREATION |
| PRD | NOT DELETE |

FIG. 11

| TAG | DEPLOYMENT ENVIRONMENT WHERE DEPLOYMENT CAN BE EXECUTED | | | | | |
|---|---|---|---|---|---|---|
| TR  | TR | –  | –   | –   | –  | –   |
| TS  | TR | TS | PRV | DEM | RH | –   |
| PRV | TR | TS | PRV | DEM | RH | –   |
| DEM | TR | TS | PRV | DEM | RH | –   |
| RH  | TR | TS | PRV | DEM | RH | PRD |
| PRD | TR | TS | PRV | DEM | RH | PRD |

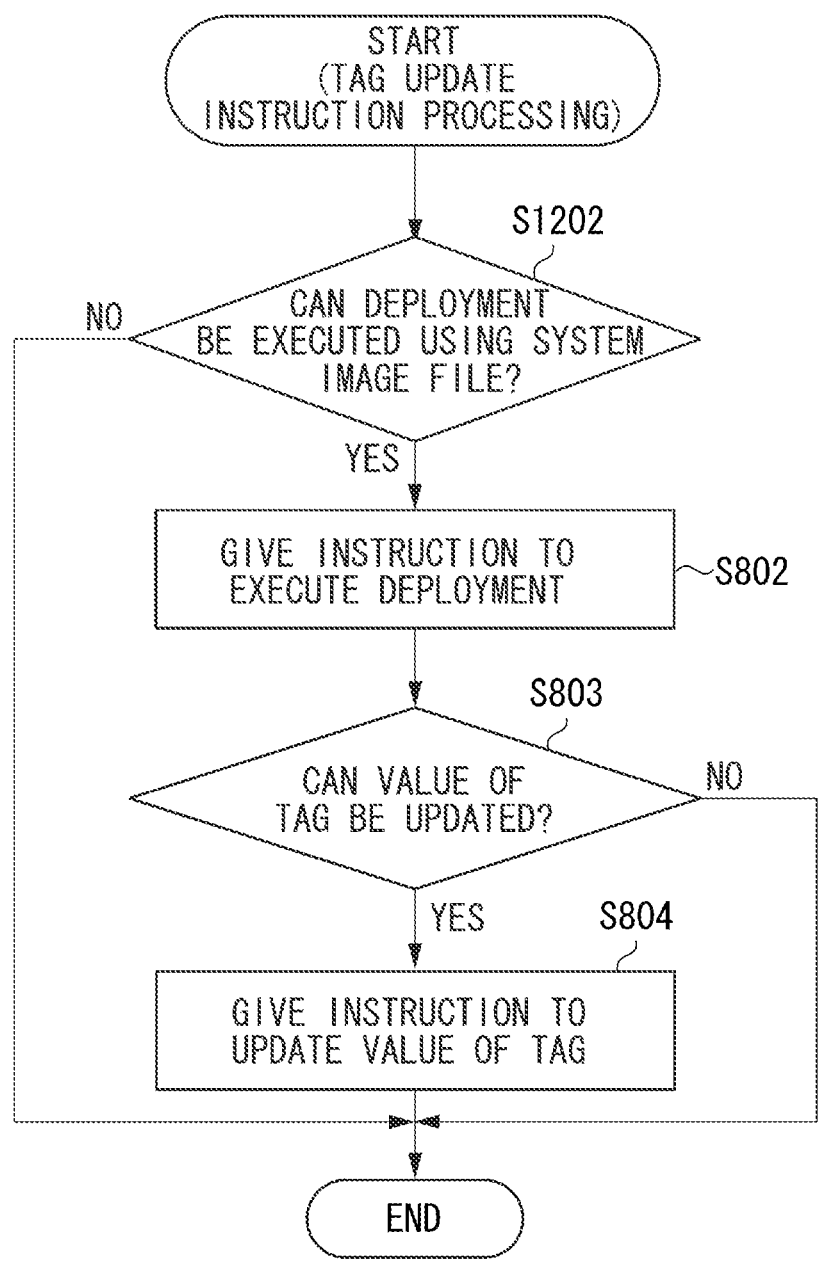

FIG. 15

| DEPLOYMENT ENVIRONMENT | SYSTEM IMAGE FILE FOR BLUE ENVIRONMENT | SYSTEM IMAGE FILE FOR BLUE ENVIRONMENT ONE GENERATION AGO |
|---|---|---|
| TR | Front-20150401-120000, Bat-20150401-120000 | Front-20150401-090000, Bat-20150401-090000 |
| TS | Front-20150321-125500, Bat-20150321-125500 | Front-20150321-083000, Bat-20150321-083000 |
| PRV | Front-20150211-184500, Bat-20150211-184500 | Front-20150211-164500, Bat-20150211-164500 |
| DEM | Front-20150211-184500, Bat-20150211-184500 | Front-20150211-064500, Bat-20150211-064500 |
| RH | Front-20150211-184500, Bat-20150211-184500 | Front-20150203-164500, Bat-20150203-164500 |
| PRD | Front-20150101-120000, Bat-20150101-120000 | Front-20140601-090000, Bat-20140601-090000 |

1511
1512
1513
1514
1515
1516

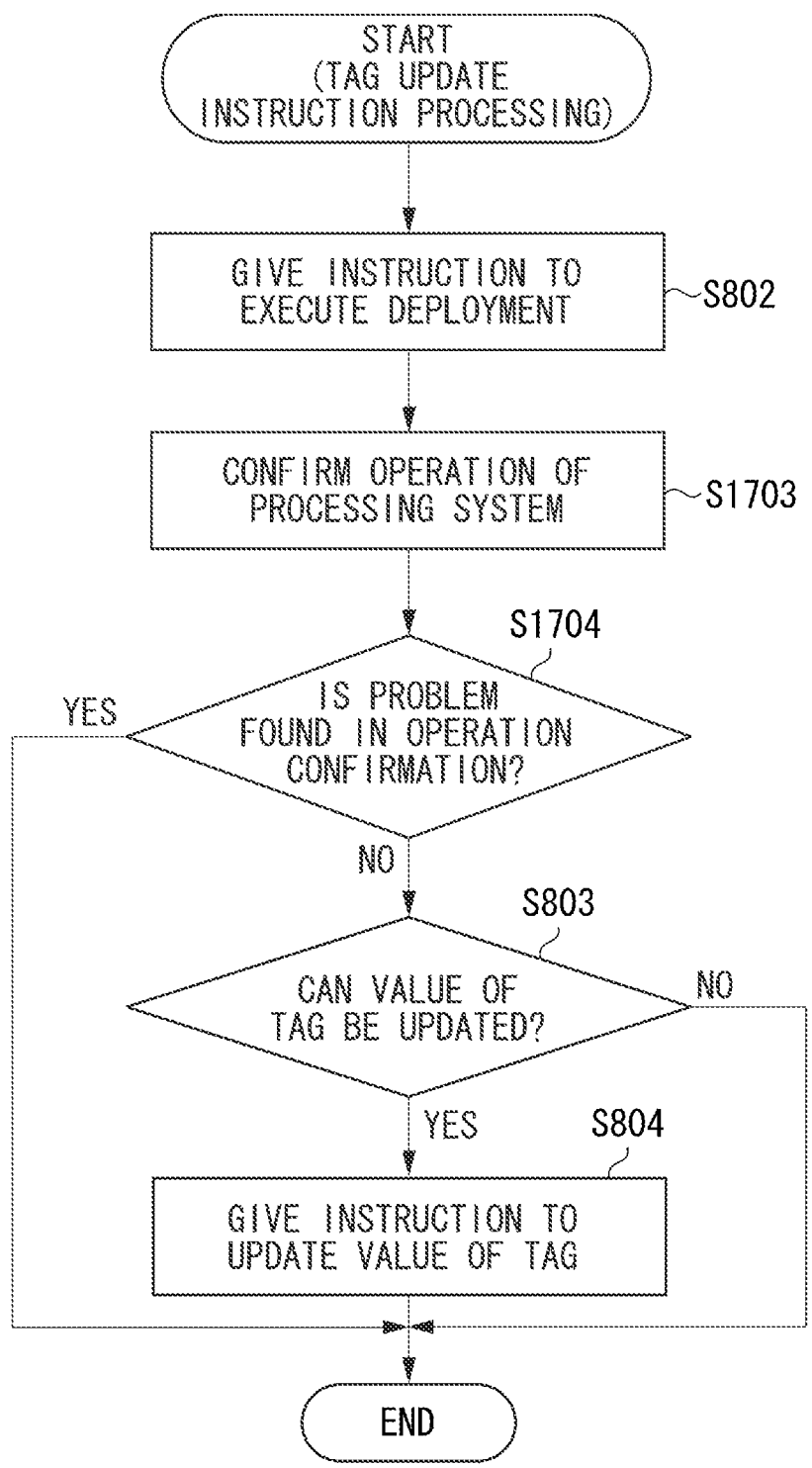

MANAGEMENT SYSTEM AND CONTROL METHOD

BACKGROUND OF THE INVENTION

Field of the Invention

The present disclosure relates to a management system for managing a system image file regarding software and a setting file, and a control method.

Description of the Related Art

In recent years, as a service that allows the use of various applications operating on a server existing on the Internet, a cloud service has been known. In a cloud service such as Infrastructure as a service (IaaS) or Platform as a service (PaaS), a cloud service vendor provides resources such as virtual machines and a storage for a cloud service to a cloud service user via a network. The virtual machines are achieved as follows by virtualization technology. A server computer is divided into logical units, regardless of the physical configuration of the server computer, and a logical computer operates with the divided logical units each having independent operating systems (OSs). The cloud service user can construct a system for providing a unique service for a customer (hereinafter referred to as a "processing system"), using the resources such as the virtual machines and the storage provided by the cloud service vendor. The processing system includes a web application, a database, a load balancer, and a domain name system (DNS) server, and these components are connected to each other via a network.

In such a cloud service using virtualization technology, a virtual machine in which software, such as an application and middleware, and a setting file are installed can be created as a system image file together with an OS. Normally, the created system image file is stored on the cloud service. The virtual machine is started using the created system image file, whereby it is possible to easily start any number of virtual machines in which software has already been installed, and various settings have already been made.

Using the system image file, it is possible to start virtual machines in which the same application operates. The process of constructing a processing system including started virtual machines so that a service provided by the processing system can be used via a personal computer (PC) on a network is referred to as a "deployment".

A processing system is deployed in a deployment environment according to a purpose such as development, evaluation, or production. In the following description, a deployment environment will occasionally be referred to simply as an "environment". Deployment environments for development, evaluation, and production are referred to as a "development environment", an "evaluation environment", and a "production environment", respectively. The production environment is a deployment environment where a processing system for providing a service to a customer can be deployed. The customer accesses the processing system deployed in the production environment via a PC and receives the provided service. The deployment environments for development and evaluation are environments used before a processing system is deployed in the production environment. For example, processing systems are deployed in the evaluation environment using system image files corresponding to some of a plurality of processing systems deployed in the development environment, whereby the systems are migrated. In the evaluation environment, the migrated processing systems are evaluated. Then, the systems are migrated to the production environment using system image files corresponding to some of the plurality of processing systems deployed in the evaluation environment. As described above, there is a case where a deployment is performed using a system image file used once for a deployment again.

In recent years, a method termed continuous integration (CI) for obtaining a high quality of software by advancing the development of the software while continuously confirming the quality of the software is used in software development. In the CI method, a build and a test of a source code is performed frequently, i.e., several times to several tens of times a day, thereby confirming whether the quality of software is maintained. Analyzing a source code using a computer, and generating an application is referred to as a "build". Further, in the development of a processing system based on the CI method, there is a case where, after a build and a test of a source code is performed, a system image file as described above is created. In recent years, a cloud service for providing a function of software such as a CI support tool also appears.

In such development of a processing system employing the CI method, a new system image file is created every time a part of a parameter for a setting file included in a system image file is changed. For example, if a processing system including several types of virtual machines is deployed about ten times a day, several tens of system image files are created in a day. Further, the data size of a single system image file may amount to several gigabytes. To save a resource such as a storage on the cloud, it is necessary to appropriately delete a system image file that is no longer necessary.

Japanese Patent Application Laid-Open No. 2005-332223 discusses a technique for managing an image file regarding a virtual machine. Japanese Patent Application Laid-Open No. 2005-332223 discusses the process of managing, based on a group specified by an administrator, a master image including a file in a storage area in which an OS for a virtual machine and an application program are installed, and deleting the master image based on the group. Japanese Patent Application Laid-Open No. 2005-332223 discusses a technique for, only if a master image for which a deletion instruction is given by the administrator does not belong to a group, deleting the master image.

Regarding the above-described deletion of a system image file, system image files may be deleted, for example, in the chronological order of the creation dates of the system files. In this case, even though a system image file not to be used again for another deployment is unnecessary, the system image file may be stored without being deleted for a while because the creation date of the system image file is new.

On the other hand, even though a system image file to be used again for another deployment is necessary, the system image file may be deleted because the creation date of the system image file is old. If the system image file is deleted, the system image file cannot be used for a deployment in another deployment environment. In this regard, a system image file may be created based on a virtual machine in a processing system that has already been constructed and is operating. This way, however, cannot be employed in a case where the processing system is deleted.

Japanese Patent Application Laid-Open No. 2005-332223 is on the premise of the construction of a processing system employing the CI method. Further, Japanese Patent Application Laid-Open No. 2005-332223 does not assume that a system image file is deleted in consideration of a deployment environment where a processing system is deployed using the system image file.

SUMMARY OF THE INVENTION

According to an aspect of the present disclosure, a management system for deleting, from a storage device that stores a system image file including at least information of software operating on a virtual machine, the system image file, includes an assignment instruction unit configured to give an instruction to assign a value of an attribute corresponding to an environment where a processing system including a virtual machine started using a system image file is constructed, to the system image file, a first determination unit configured to determine whether the system image file is to be deleted based on a condition according to the value of the attribute assigned to the system image file in response to the instruction given by the assignment instruction unit, and a deletion instruction unit configured to give an instruction to delete, from the storage device, the system image file that has been determined to be deleted by the first determination unit.

Further features of the present invention will become apparent from the following description of exemplary embodiments with reference to the attached drawings.

BRIEF DESCRIPTION OF THE DRAWINGS

FIG. 6 illustrates an example of a tag update order table.

FIG. 9 illustrates an example of a deletion condition table indicating a deletion condition for the system image file according to a tag.

FIG. 11 illustrates an example of a deployment environment table indicating a deployment environment where a deployment can be executed according to a tag.

FIG. 12 is a flowchart illustrating an example of a flow of tag update instruction processing according to a second exemplary embodiment.

FIG. 15 illustrates an example of a system image file management table.

FIG. 17 is a flowchart illustrating an example of a flow of tag update instruction processing according to a fourth exemplary embodiment.

DESCRIPTION OF THE EMBODIMENTS

With reference to the drawings, exemplary embodiments of the present disclosure will be described below.

Figure 1A:
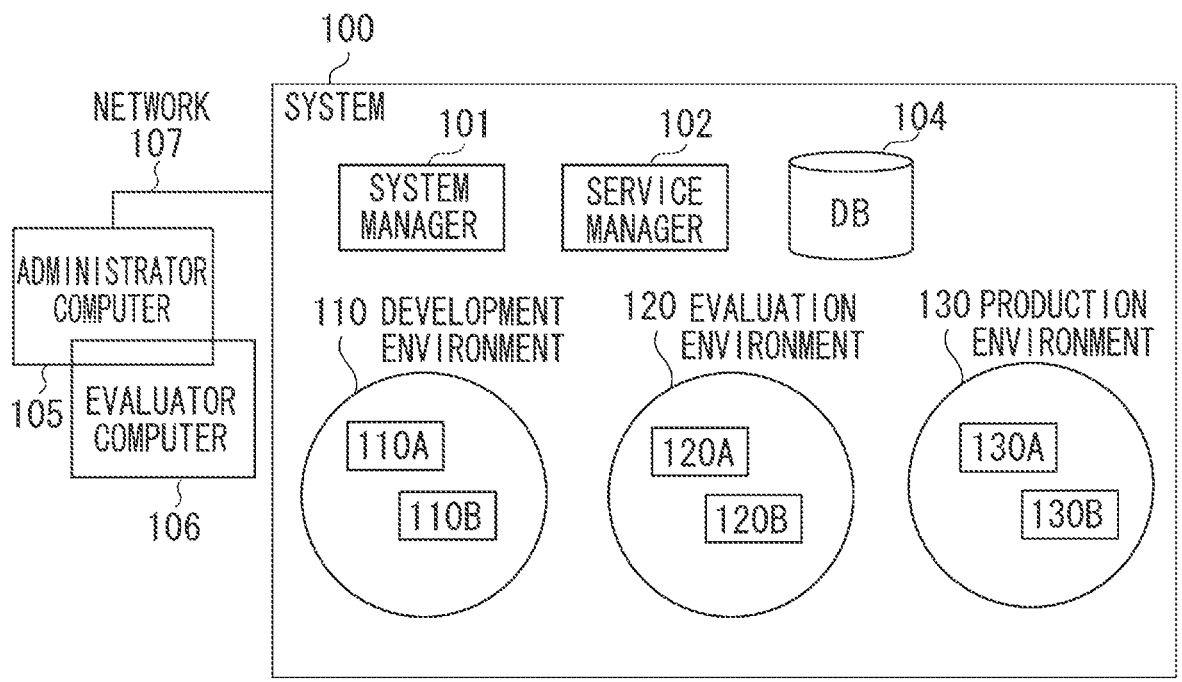
FIGS. 1A and 1B are diagrams illustrating an example of a configuration of a network system according to an exemplary embodiment.
Figure 1B:
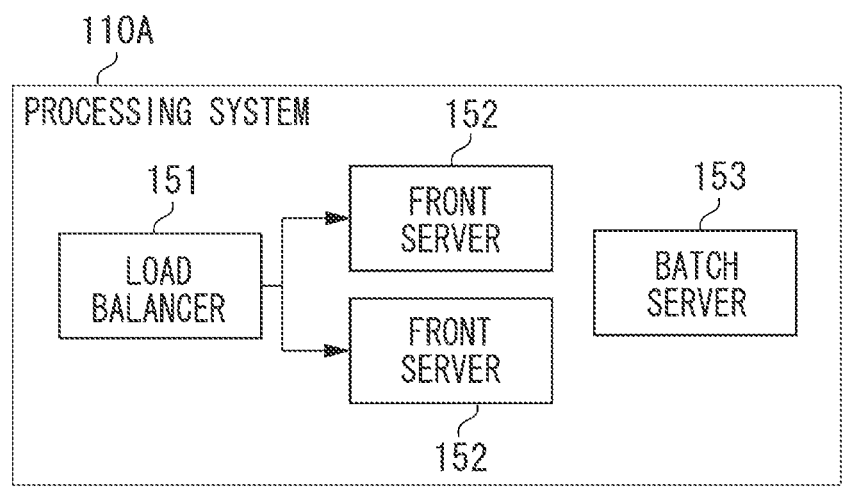

FIGS. 1A and 1B are diagrams illustrating an example of a configuration of a network system according to a first exemplary embodiment. As illustrated in FIG. 1A, a system 100 is connected to an administrator computer 105 and an evaluator computer 106 via a network 107. The system 100 is constructed using virtual machines and a storage as resources provided by a cloud service. The virtual machines are achieved as follows by virtualization technology. A server computer on a data center is divided into logical units, regardless of the physical configuration of the server computer, and a logical computer operates with the divided logical units having independent operating systems. The system 100 is constructed using a plurality of virtual machines operating on a single server computer.

As the administrator computer 105, a computer operated by an administrator of the system 100 or a developer is assumed. The administrator computer 105 includes a browser function and the function of communicating with a system manager 101. As the evaluator computer 106, a computer operated by a person in charge of evaluation who tests a processing system deployed in an evaluation environment 120 of the system 100 is assumed. As the network 107, a local area network (LAN), a wide area network (WAN), or the Internet is assumed.

The system 100 includes a system manager 101, a service manager 102, a database (DB) 104, a development environment 110, an evaluation environment 120, and a production environment 130. The system manager 101 and the service manager 102 may be achieved as virtual machines, or may be physical server computers.

The system manager 101 functions as a management system for instructing the service manager 102 to create or delete a system image file. The processing of the system manager 101 will be described below with reference to FIG. 5. The service manager 102 receives an instruction from the system manager 101 and executes the process of creating or deleting a system image file. The function of the service manager 102 may be a function provided by a cloud service vendor. The DB 104 is a storage device such as a database for storing a program for achieving the system 100, various types of data for providing a service for a user, and a system image file.

The process of constructing a processing system including a virtual machine started using a system image file so that the user or the developer can use a service is referred to as a "deployment". Deployment environments according to purposes such as development, evaluation, and production are referred to as a "development environment", an "evaluation environment", and a "production environment", respectively. In each environment, a plurality of processing systems can be constructed. The "production environment" refers to an environment where a request from a client computer (not illustrated) present outside the system 100 can be received, and a service can be provided. Although not illustrated in FIG. 1A, a deployment environment for a purpose other than development, evaluation, and production (an environment for an advance release, an environment for a demonstration, or an environment for a production rehearsal) may be present in the system 100.

FIG. 1A illustrates the state where processing systems 110A and 110B are deployed in the development environment 110. In this manner, in each deployment environment, a plurality of processing systems can be deployed, and a version upgrade of each system can be performed using a blue-green deployment. The blue-green deployment will be described in a third exemplary embodiment.

FIG. 1B is a diagram illustrating an example of a configuration of a processing system. The processing system 110A deployed in the development environment 110 includes a load balancer 151, a front server 152, and a batch server 153, which are achieved as one or more virtual machines. Basically, the processing system 110B and processing systems 120A, 120B, 130A, and 130B also include configurations similar to that of the processing system 110A.

The load balancer 151 is a load distribution apparatus for distributing a received request to the front server 152. The front server 152 receives and processes a request from the load balancer 151. The batch server 153 executes processing at a predetermined time. A plurality of front servers 152 and a plurality of batch servers 153 may be present.

The content of the processing executed by each of the front server 152 and the batch server 153 can change according to a function provided by the system 100 and is not limited in the present disclosure. Further, a server of a different type other than the front server 152 and the batch server 153 may be present according to a function provided by the system 100. As a server of a different type, for example, a back-end server for receiving and processing a request from the front server 152, or a web user interface (UI) server for providing a UI screen for a computer externally accessing the system 100 can be present.

Figure 2:
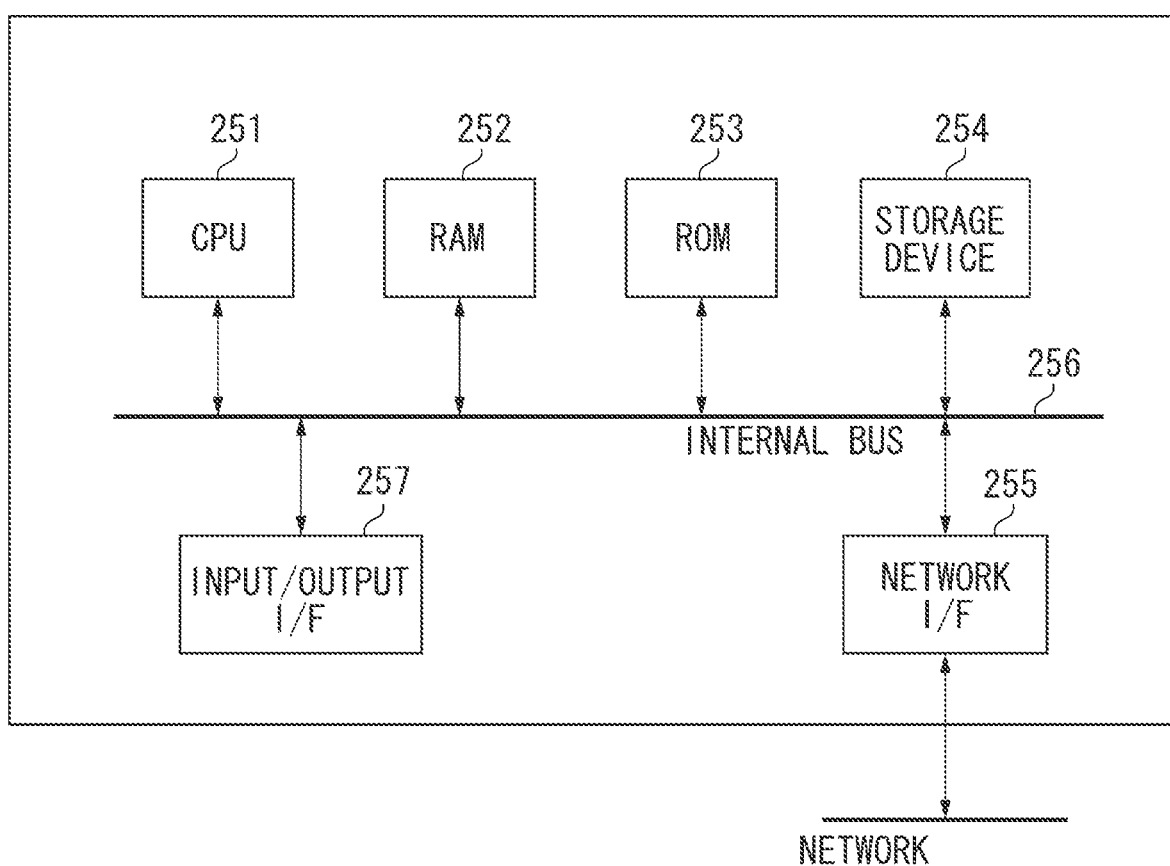
FIG. 2 is a diagram illustrating an example of a hardware configuration of an information processing apparatus.

FIG. 2 is a diagram illustrating an example of the hardware configuration of an information processing apparatus. Examples of an information processing apparatus according to a first exemplary embodiment include a server computer present on a data center where the system 100 is constructed, the administrator computer 105, and the evaluator computer 106.

The information processing apparatus includes a central processing unit (CPU) 251, which executes a program stored in a read-only memory (ROM) 253. The information processing apparatus performs overall control of devices via an internal bus 256. The internal bus 256 is connected to a random-access memory (RAM) 252, the ROM 253, a storage device 254, a network interface (I/F) 255, and an input/output I/F 257. Further, the input/output I/F 257 includes, for example, a PS/2 port, a Universal Serial Bus (USB) I/F, and an analog or digital display I/F. Using the input/output I/F 257, a keyboard, a mouse, a cathode ray tube (CRT) display, or a liquid crystal display (not illustrated) can be connected to the information processing apparatus. Using the network I/F 255, the information processing apparatus performs communication via a LAN, an intranet environment, or the Internet. This enables the information processing apparatus to communicate with a network device or another information processing apparatus. The CPU 251 performs the process of executing a program together with the RAM 252 and the ROM 253. Further, the CPU 251 can also execute a program for achieving virtualization technology. Further, the CPU 251 performs the process of recording data in a recording medium such as the storage device 254. The storage device 254 functions as an external storage device and stores various pieces of information. Additionally, instead of the RAM 252, the storage device 254 can also save various pieces of system information and processing information.

Figure 3A:
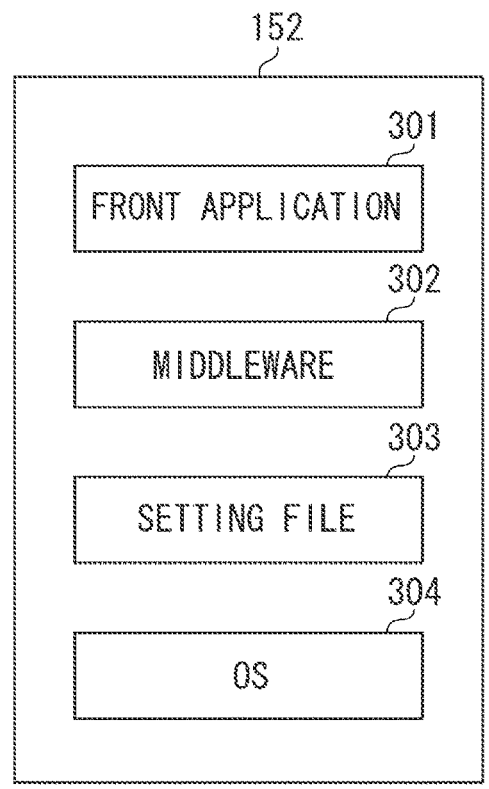
FIGS. 3A and 3B are diagrams illustrating an example of a configuration of a front server and an example of a configuration of a batch server, respectively.
Figure 3B:
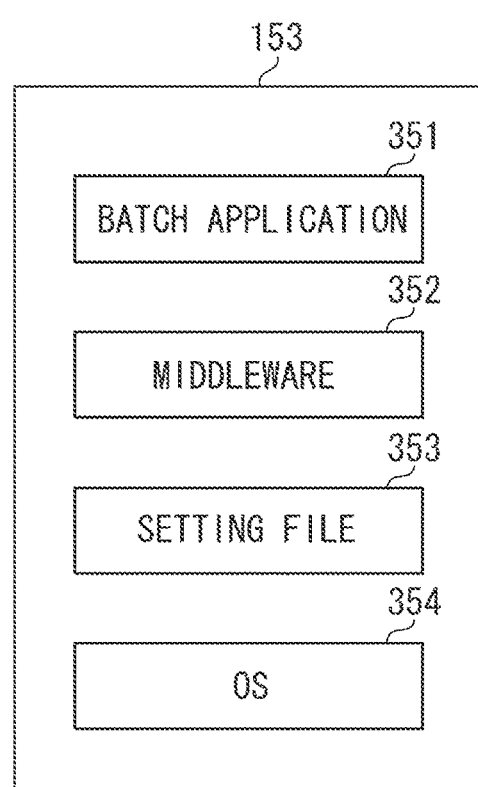

FIGS. 3A and 3B are diagrams illustrating an example of a configuration of a front server and an example of a configuration of a batch server, respectively. The front server 152 and the batch server 153 are achieved as virtual machines.

As illustrated in FIG. 3A, the front server 152 includes a front application 301, middleware 302, a setting file 303, and an operating system (OS) 304.

The front application 301 is an application for achieving some or all of functions provided by the system 100. The middleware 302 is software for, for example, a web server for providing the function of starting the front application 301, and for providing the function of transferring a request from the load balancer 151 to the front application 301. The setting file 303 is a file in which setting information necessary for the front application 301 and the middleware 302 to achieve the functions is described. The OS 304 is a computer program for providing the front application 301 and the middleware 302 with an interface for using a hardware resource for a virtual machine.

FIG. 3B is a diagram illustrating an example of a configuration of the batch server 153. The batch server 153 includes a batch application 351, middleware 352, a setting file 353, and an OS 354.

The batch application 351 is an application for achieving some or all of functions provided by the system 100. The middleware 352 is software for, for example, providing the function of starting the batch application 351. The setting file 353 is a file in which setting information necessary for the batch application 351 and the middleware 352 to achieve the functions is described. The OS 354 is a computer program for providing the batch application 351 and the middleware 352 with an interface for using a hardware resource for a virtual machine.

As described above, at least any of an OS, a setting file, middleware, and an application differs according to the type of a server such as the front server 152 or the batch server 153.

Figure 4:
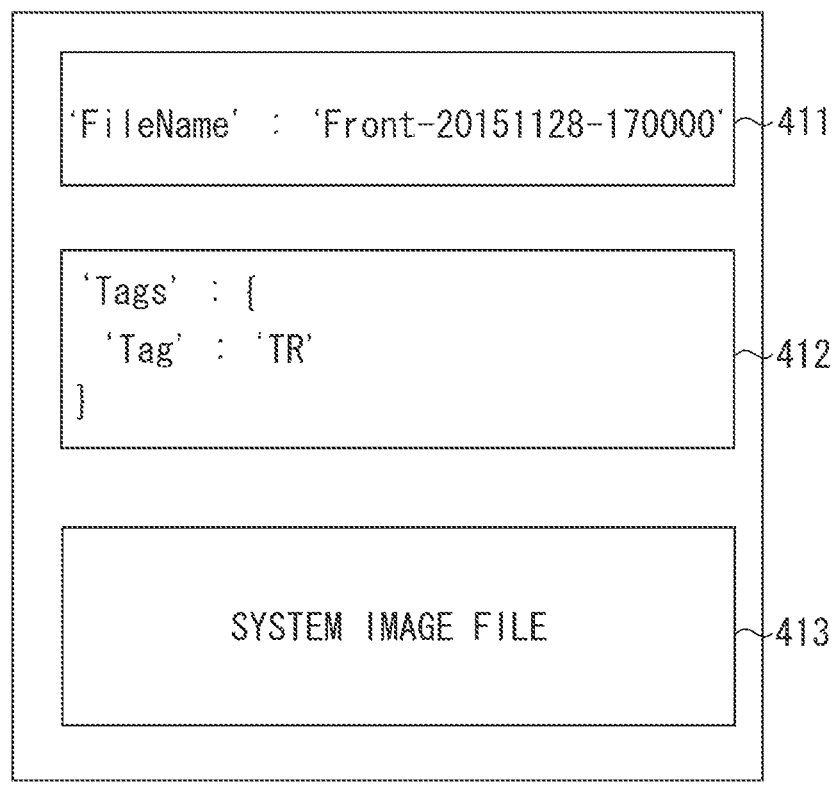
FIG. 4 is a diagram illustrating an example of a configuration of data including a system image file.

FIG. 4 is a diagram illustrating an example of a configuration of data including a system image file 413. The data including the system image file is saved in the DB 104.

The system image file 413 is obtained by creating one or more binary format files based on the components of the servers illustrated in FIGS. 3A and 3B. In a particular cloud service, the system image file 413 is also referred to as a "golden image". In the present exemplary embodiment, when a processing system is deployed, the system image file 413 is used to start a virtual machine. The process of creating a system image file based on a virtual machine is referred to as "imaging" of a virtual machine.

Further, in a system constructed using a cloud service, according to the settings of a system administrator, it is possible to adjust the amount of resource by automatically increasing or decreasing the number of virtual machines according to the number of requests to be received or the load for processing the requests. To increase the number of virtual machines, a new virtual machine is started. Also at this time, the virtual machine can be started using the system image file 413.

The system image file 413 may include components other than those illustrated in FIGS. 3A and 3B, or may not necessarily include the components other than the OS 304 and the OS 354.

An identifier 411 is an identifier at least representing the type of a server started using the system image file 413, and the creation date and time of the file. Although the format of the identifier 411 is as illustrated in FIG. 4, for example, the representation method of the identifier 411 is not limited to this.

A tag 412 is one of the attributes of the system image file 413 and indicates the association with an environment where a processing system including a virtual machine started using the system image file 413 is deployed. For the tag 412, a value such as TR, TS, PRV, DEM, RH, or PRD is set. These values indicate an environment for the purpose of development (TR), an environment for the purpose of evaluation of quality assurance (TS), an environment for an advance release (PRV), and an environment for a demonstration (DEM), an environment for a production rehearsal (RH), and an environment for the purpose of production (PRD). There is an order relationship between these values of the tag 412. Accordingly, there is a case where the update of the value of the tag 412 is restricted due to this order relationship. The method for managing the association between the system image file and the deployment environment is not limited to the assignment of a tag. Alternatively, for example, the association between the system image file and the deployment environment may be managed in a table in the DB 104. Further, for several deployment environments used in a similar manner, the same value can also be set as the value of the tag 412.

In a case where a plurality of DBs 104 are present, a common identification (ID) may be assigned to the identifier 411, the tag 412, and the system image file 413, and then, the identifier 411, the tag 412, and the system image file 413 may be separately saved in the plurality of DBs 104.

Figure 5:
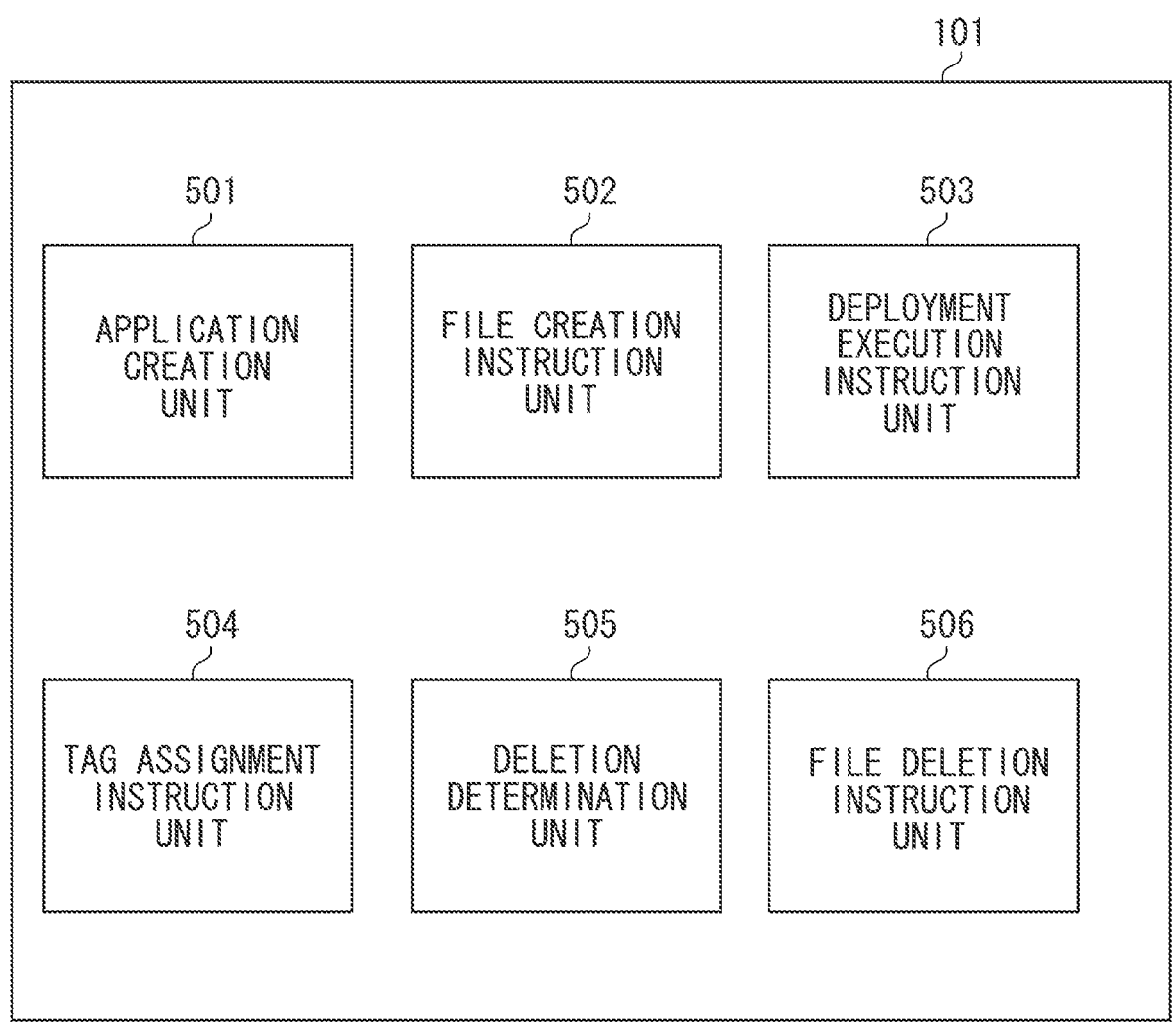
FIG. 5 is a diagram illustrating an example of a configuration of a system manager.

FIG. 5 is a diagram illustrating an example of a configuration of the system manager 101. Functions illustrated in FIG. 5 are achieved by the CPU 251 of the server computer on the data center reading and executing a program recorded in the storage device 254. The system manager 101 includes an application creation unit 501, a file creation instruction unit 502, a deployment execution instruction unit 503, a tag assignment instruction unit 504, a deletion determination unit 505, and a file deletion instruction unit 506.

According to an input from the administrator computer 105, the application creation unit 501 builds a source code and creates the front application 301 and the batch application 351.

The file creation instruction unit 502 installs software onto virtual machines and saves setting files. The software includes the front application 301, the middleware 302, the OS 304, the batch application 351, the middleware 352, and the OS 354 illustrated in FIGS. 3A and 3B. Then, the file creation instruction unit 502 instructs the service manager 102 in the system 100 to perform imaging of the virtual machines and create system image files 413. Then, based on the instruction from the file creation instruction unit 502, the service manager 102 creates system image files 413. The created system image files 413 are saved in the DB 104.

The deployment execution instruction unit 503 starts the virtual machines using the system image files 413 created by the file creation instruction unit 502 and constructs a processing system in a deployment environment so that a service can be used.

After the processing system is deployed using the system image files 413, the tag assignment instruction unit 504 instructs the service manager 102 to assign the value of the tag 412 to the system image files 413 or update the value of the tag 412. The value of the tag 412 to be assigned or updated is the value of the tag 412 indicating the deployment environment where the processing system is deployed. Then, based on the instruction from the tag assignment instruction unit 504, the service manager 102 assigns the value of the tag 412 to the system image files 413 or updates the value of the tag 412.

According to a predetermined condition, the deletion determination unit 505 determines whether each of the system image files 413 is to be deleted. More specifically, based on a condition according to the value of the tag 412 assigned to each of the system image files 413, the deletion determination unit 505 determines whether the system image file 413 is to be deleted. The condition according to the value of the tag 412 will be described below with reference to FIG. 9.

If the deletion condition according to the value of the tag 412 is satisfied, the file deletion instruction unit 506 instructs the service manager 102 to delete the corresponding system image file 413 from the DB 104. Then, based on the instruction from the file deletion instruction unit 506, the service manager 102 deletes the system image file 413 saved in the DB 104.

The application creation unit 501 may be present not in the system manager 101 but in the administrator computer 105.

FIG. 6 illustrates an example of a tag update order table. The table is stored in the DB 104. In the table, the values of the tag 412 to which each value of the current tag 412 of the system image file 413 can be updated are described.

The tag assignment instruction unit 504 of the system manager 101 references the values of the tag 412 indicated by records 611 to 616. For example, if the value of the tag 412 of the system image file 413 is TR, the tag 412 can be updated only to TS. If the value of the tag 412 is TS, the tag assignment instruction unit 504 can update the value of the tag 412 to PRV, DEM, or RH. Further, if the value of the tag 412 is PRD, the tag 412 cannot be updated to any value. If a processing system is deployed using the system image file 413 of which the value of the tag 412 is PRD, PRD is maintained as the value of the tag 412 of the system image file 413 regardless of deployment environments in which the processing system is deployed.

Figure 7:
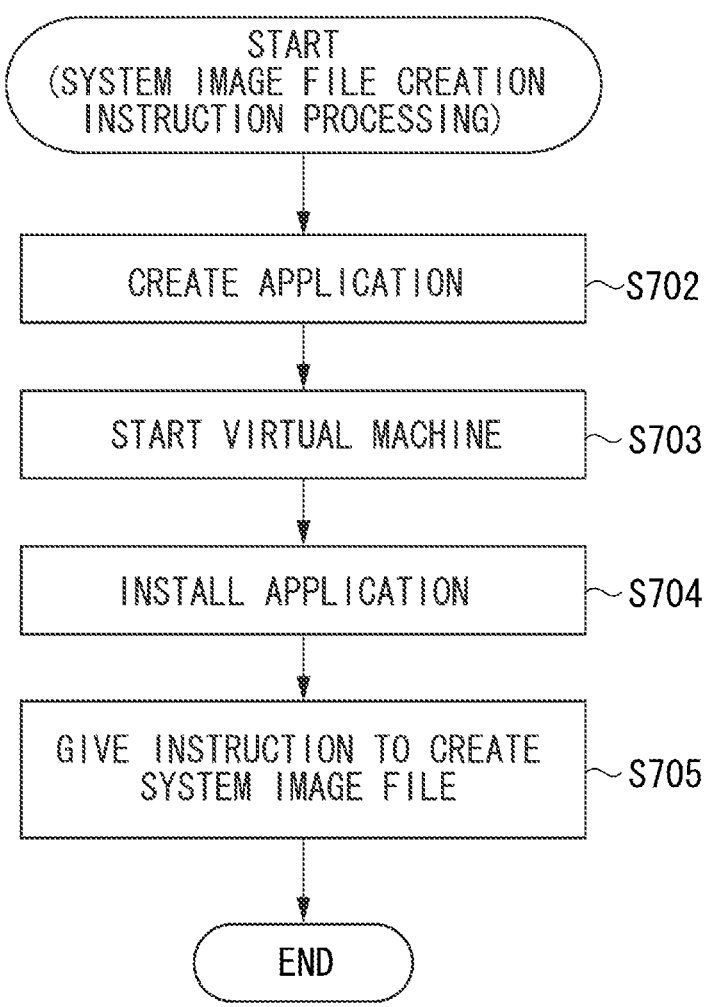
FIG. 7 is a flowchart illustrating an example of a flow of system image file creation instruction processing.

FIG. 7 is a flowchart illustrating an example of a flow of system image file creation instruction processing. According to a request from the administrator or at a predetermined time, the system manager 101 executes the system image file creation process in this flowchart.

In step S702, the application creation unit 501 builds a source code and creates an application. In step S703, the application creation unit 501 starts a virtual machine onto which to install the application. In step S704, the file creation instruction unit 502 installs the application created in step S702 onto the virtual machine started in step S703. At this time, the file creation instruction unit 502 also installs middleware and a setting file onto the virtual machine. In step S705, the file creation instruction unit 502 instructs the service manager 102 to perform imaging of the virtual machine into which the application and the like are installed in step S704, and create a system image file 413. Then, based on the instruction from the file creation instruction unit 502, the service manager 102 creates a system image file 413 and saves the created system image file 413 in the DB 104.

The system image file creation instruction processing in this flowchart is performed for each type of server included in a processing system deployed in the development environment. For example, in a case where a processing system including two types of servers is deployed 10 times a day, up to 20 system image files are created in a day. The data size of a single system image file may amount to several gigabytes. Thus, a large storage capacity is required on the cloud.

Figure 8:
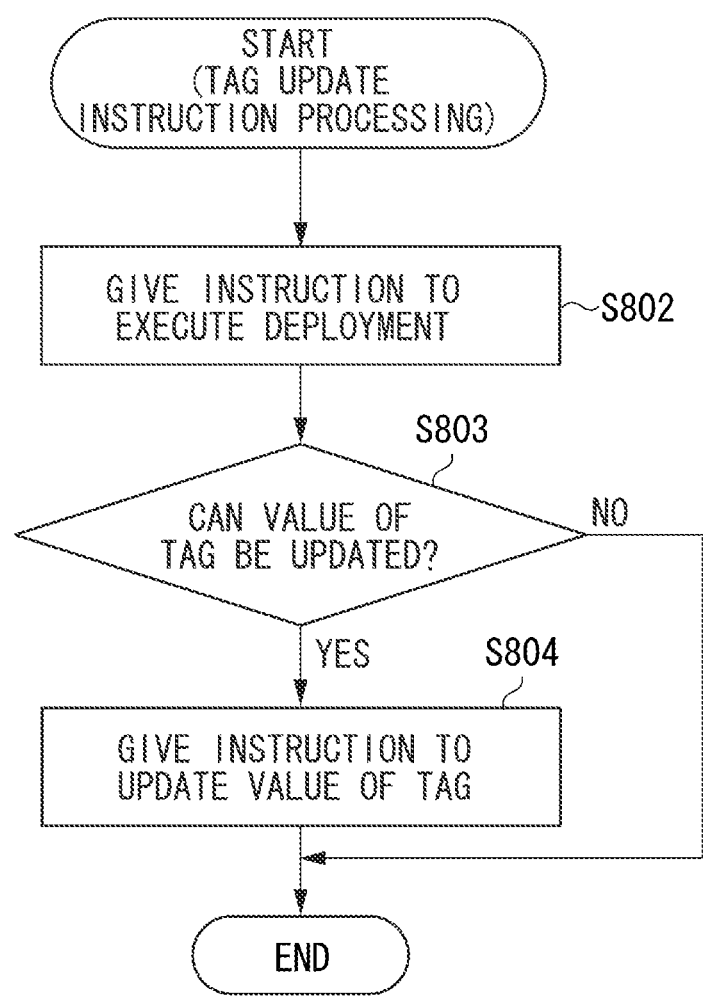
FIG. 8 is a flowchart illustrating an example of a flow of tag update instruction processing.

FIG. 8 is a flowchart illustrating an example of a flow of tag update instruction processing. According to a request from the administrator or at a predetermined time, the system manager 101 executes the tag update instruction processing in this flowchart.

In step S802, the deployment execution instruction unit 503 instructs the service manager 102 to deploy a processing system in a deployment environment indicated by the administrator or determined in advance. Then, based on the instruction from the deployment execution instruction unit 503, the service manager 102 executes the deployment. For this deployment, a system image file 413 according to a request from the administrator is used. In a case where the tag update instruction processing (FIG. 8) is executed subsequent to the system image file creation instruction processing (FIG. 7), the system image file 413 created in step S705 is used for the deployment.

After the deployment is executed, then in step S803, the tag assignment instruction unit 504 references the value of the tag 412 of the system image file 413 and the tag update order table and determines whether the value of the tag 412 can be updated. If the tag assignment instruction unit 504 determines that the value of the tag 412 can be updated (YES in step S803), the processing proceeds to step S804. If the tag assignment instruction unit 504 determines that the value of the tag 412 cannot be updated (NO in step S803), the processing ends. In step S804, the tag assignment instruction unit 504 instructs the service manager 102 to update the value of the tag 412 of the system image file 413 to a value indicating the deployment environment where the deployment is executed in step S802. Then, based on the instruction from the tag assignment instruction unit 504, the service manager 102 updates the value of the tag 412.

If the deployment execution instruction unit 503 deploys a processing system in the development environment in step S802, then in step S804, the tag assignment instruction unit 504 assigns TR as the value of the tag 412. Further, for example, if the deployment is executed in the development environment using a system image file 413 assigned the tag "TR", a value of TR is maintained without updating the value of the tag 412.

FIG. 9 illustrates an example of a deletion condition table indicating a deletion condition for the system image file 413 according to the tag 412. This table is stored in the DB 104. In the table, a deletion condition for the system image file 413 is described with respect to each value of the tag 412. The table is referenced in the process of deleting the system image file 413, which will be described below with reference to FIG. 10.

The deletion determination unit 505 references deletion conditions indicated by records 911 to 916, for example. If the time elapsed since the system image file 413 is created exceeds a predetermined time determined for each value of the tag 412, the deletion determination unit 505 determines that the system image file 413 is to be deleted. For example, if the tag 412 of the system image file 413 is TR, and three days or more elapse since the system image file 413 has been created, the system image file 413 is deleted. If the tag 412 is TS, and 15 days or more elapse since the system image file 413 has been created, the system image file 413 is deleted. As described above, according to the value of a tag assigned to a system image file, an appropriate deletion condition is applied. Consequently, taking into account an environment constructed using a system image file, the deletion determination unit 505 can determine whether the system image file is to be deleted.

As illustrated in the tag update order table (FIG. 6), the tag "TR" can be updated to the tag "TS", and the predetermined time regarding the deletion condition in the case of TS is longer than that in the case of TR. For example, in the system according to the present application, it is assumed that the value of the tag of about one out of 10 system image files assigned the tag "TR" is updated to "TS". In other words, since many system image files assigned the tag "TR" are created, the predetermined time regarding the deletion condition in the case of TR needs to be sufficiently shorter than the predetermined time regarding the deletion condition in the case of TS. It is desirable that the difference between the predetermined time in the case of TR and the predetermined time in the case of TS should be at least equal to or longer than the predetermined time in the case of TR. Consequently, it is possible to store a system image file assigned the tag "TS" for a long time after the system image file is created, and also delete early a system image file for which the tag "TR" is maintained without updating the value of the tag to TS.

Further, if the tag 412 is PRD, the system image file 413 is not deleted, regardless of the time elapsed since the system image file 413 is created. Consequently, it is possible to save a system image file used for a deployment in the production environment and assigned the tag "PRD", without deleting the system image file. Using a method described in a third exemplary embodiment, it is also possible to delete a system image file that is assigned the tag "PRD" and is no longer used.

The number of days in each deletion condition described in the deletion condition table is merely illustrative and is not limited to a particular number of days. However, a magnitude relationship is provided between the numbers of days in the respective deletion conditions, whereby it is possible to make the storing period of a more important system image file 413 longer. For example, in the exemplary embodiment, the degree of importance of the system image file 413 is represented as TR<TS<PRV≤DEM<RH<PRD. Thus, the magnitude relationship between the numbers of days in the respective deletion conditions is also set according to this degree of importance. Each deletion condition may be determined based not on the time elapsed since the system image file 413 is created, but on the time elapsed since the value of the tag 412 is updated.

Figure 10:
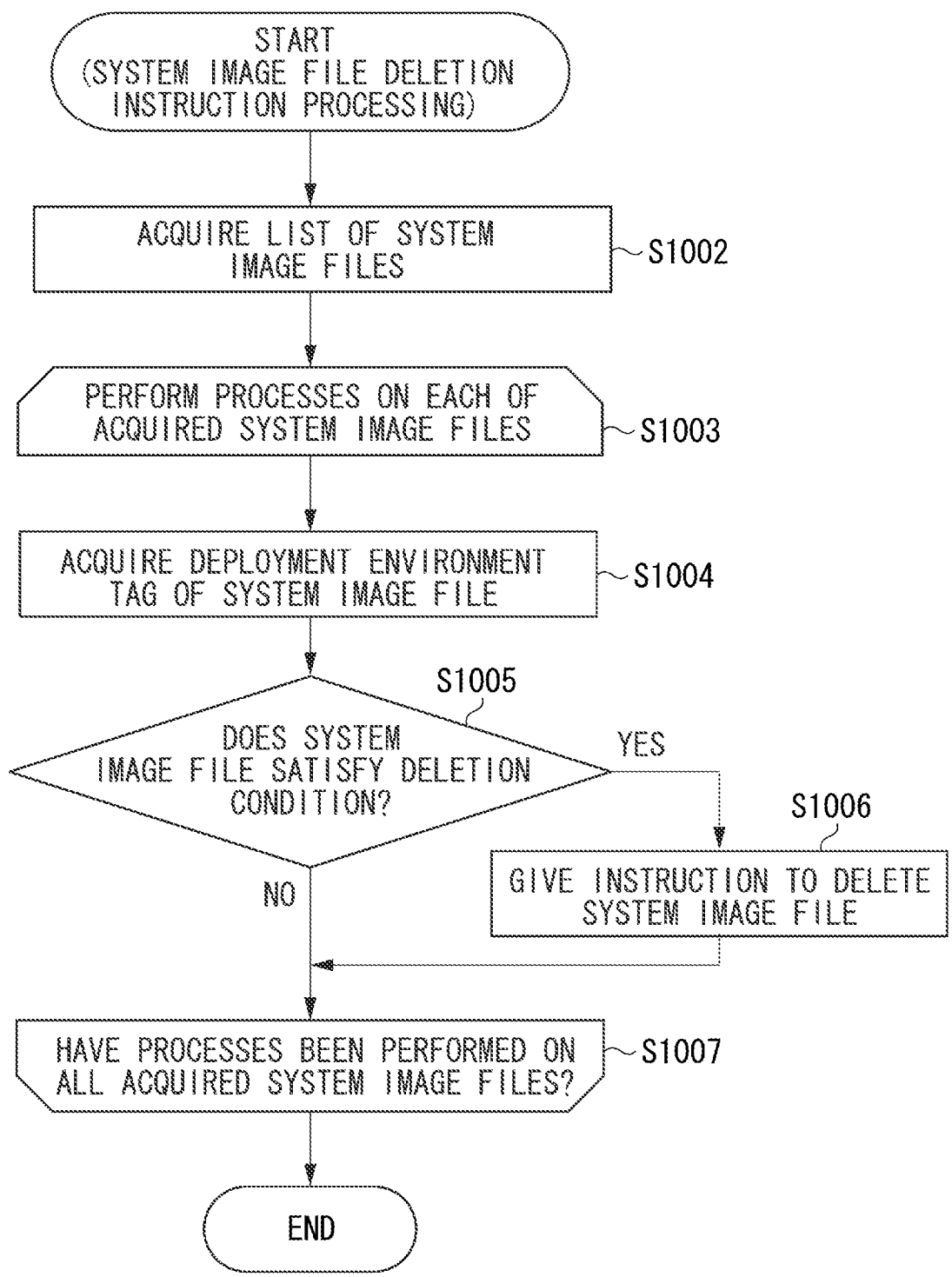
FIG. 10 is a flowchart illustrating an example of a flow of system image file deletion processing.

FIG. 10 is a flowchart illustrating an example of a flow of system image file deletion instruction processing. According to a request from the administrator or at a predetermined time, the system manager 101 executes the system image file deletion instruction processing illustrated in this flowchart. The processing of this flowchart is executed, for example, at night on about a daily basis.

In step S1002, the file deletion instruction unit 506 acquires a list of system image files 413. The processes of steps S1003 to S1007 are repeatedly executed on each of the acquired system image files 413. In step S1004, the file deletion instruction unit 506 acquires the value of the tag 412 assigned to the system image file 413. In step S1005, the file deletion instruction unit 506 references the deletion condition table and determines whether the system image file 413 satisfies the deletion condition. If the system image file 413 satisfies the deletion condition (YES in step S1005), the processing proceeds to step S1006. On the other hand, if the system image file 413 does not satisfy the deletion condition (NO in step S1005), the processing proceeds to step S1007. In step S1006, the file deletion instruction unit 506 instructs the service manager 102 to delete the system image file 413. Then, in step S1007, if the processes have been performed on all the acquired system image files 413, the processing of this flowchart ends.

In the present exemplary embodiment, a tag indicating the association between a system image file and a deployment environment is assigned, and a deletion condition is switched according to the tag. According to the present exemplary embodiment, it is possible to manage an appropriate storing period of each system image file and also delete a system image file of which the storing period elapses.

In the first exemplary embodiment, regardless of the value of a tag assigned to a system image file, a deployment can be executed using the system image file. In contrast, in a second exemplary embodiment, it is determined, based on the value of a tag assigned to a system image file, whether a deployment can be executed using the system image file. In the present exemplary embodiment, with reference to FIGS. 11 and 12, the differences from the first exemplary embodiment are mainly described.

FIG. 11 illustrates an example of a deployment environment table indicating a deployment environment where a deployment can be executed according to the tag 412. This table is stored in the DB 104. In the table, a deployment environment where a deployment can be executed using the system image file 413 is described with respect to each value of the tag 412 of the system image file 413. Using this table, it is possible, according to the value of a tag, to distinguish a system image file that can be used to construct a deployment environment.

The deployment execution instruction unit 503 of the system manager 101 references the values of deployment environments where a deployment can be executed and which are indicated by records 1111 to 1116, for example. Then, the deployment execution instruction unit 503 determines whether a deployment can be executed. For example, if the value of the tag 412 of the system image file 413 is TR, deployment environments where a deployment can be executed using the system image file 413 are only TR and TS. This can prevent the deployment execution instruction unit 503 from executing a deployment in PRV or PRD using a system image file assigned the tag "TR".

Further, if the value of the tag 412 of the system image file 413 is DEM, deployment environments where a deployment can be executed using the system image file 413 are other than PRD. This can prevent the deployment execution instruction unit 503 from executing a deployment in PRD using a system image file assigned the tag "DEM".

FIG. 12 is a flowchart illustrating an example of a flow of tag update instruction processing according to the present exemplary embodiment. According to a request from the administrator or at a predetermined time, the system manager 101 executes a deployment process involving the determination of whether a deployment can be executed, which is illustrated in this flowchart.

FIG. 12 is different from FIG. 8 in the first exemplary embodiment in that step S1202 is added. Thus, only this difference is described.

In step S1202, the deployment execution instruction unit 503 references the deployment environment table (FIG. 11), and according to the value of the tag 412 of the system image file 413 to be used for a deployment, acquires a list of deployment environments where a deployment can be executed. If the acquired list of deployment environments includes a deployment environment requested by the user or a predetermined deployment environment (YES in step S1202), the processing proceeds to step S802. If the acquired list of deployment environments includes neither the deployment environment requested by the user nor the predetermined deployment environment (NO in step S1202), the processing of this flowchart ends.

For example, it is possible to prevent a deployment from being erroneously executed in the production environment (PRD) using a system image file 413 of which the operation is not confirmed by a quality assurance department in the evaluation environment (TS).

In the present exemplary embodiment, using a tag assigned to each system image file 413, it is determined whether a deployment can be executed using the system image file 413. According to the present exemplary embodiment, it is possible, depending on the type of a tag assigned to a system image file, to limit a deployment environment where a deployment can be executed.

In the first and second exemplary embodiments, a system image file used for a deployment in the production environment is not deleted. In contrast, in a third exemplary embodiment, a description is given of a mechanism for deleting a system image file by making use of the fact that a blue environment is gradually switched by a blue-green deployment. In the present exemplary embodiment, with reference to FIGS. 13A, 13B, 14, and 15, the differences from the first exemplary embodiment are mainly described.

First, a blue-green deployment is described.

As a method for performing a version upgrade of a processing system, a blue-green deployment is used. In the blue-green deployment, during the operation of a blue environment where the current version of an application operates, a green environment where a new version of the application operates is generated. At the scheduled date and time of a version upgrade, a domain name system (DNS) record on a DNS server is changed from the blue environment to the green environment. Consequently, a processing system for receiving a request from a client such as a computer belonging to an external network system is switched from the blue environment to the green environment, thereby performing a version upgrade of a service. The "blue environment" and the "green environment" refer to processing systems constructed in a deployment environment.

A plurality of green environments may be included in a deployment environment. When a blue-green deployment is executed, it is also possible to select any of the green environments as a processing system to which to switch the current processing system.

Also in the development environment and the evaluation environment other than the production environment, a blue-green deployment is performed in the above continuous integration (CI). In the development environment and the evaluation environment, a blue-green deployment is performed by, for example, switching the transmission destination of a request from a client prepared for a test.

Further, in the following description, a blue environment immediately before the execution of a blue-green deployment is referred to as a "blue environment one generation ago" (a "former blue environment") with respect to the current blue environment after the execution of the blue-green deployment. Further, a former blue environment immediately before the execution of a blue-green deployment is referred to as a "blue environment two generations ago" with respect to the current blue environment after the execution of the blue-green deployment.

Figure 13A:
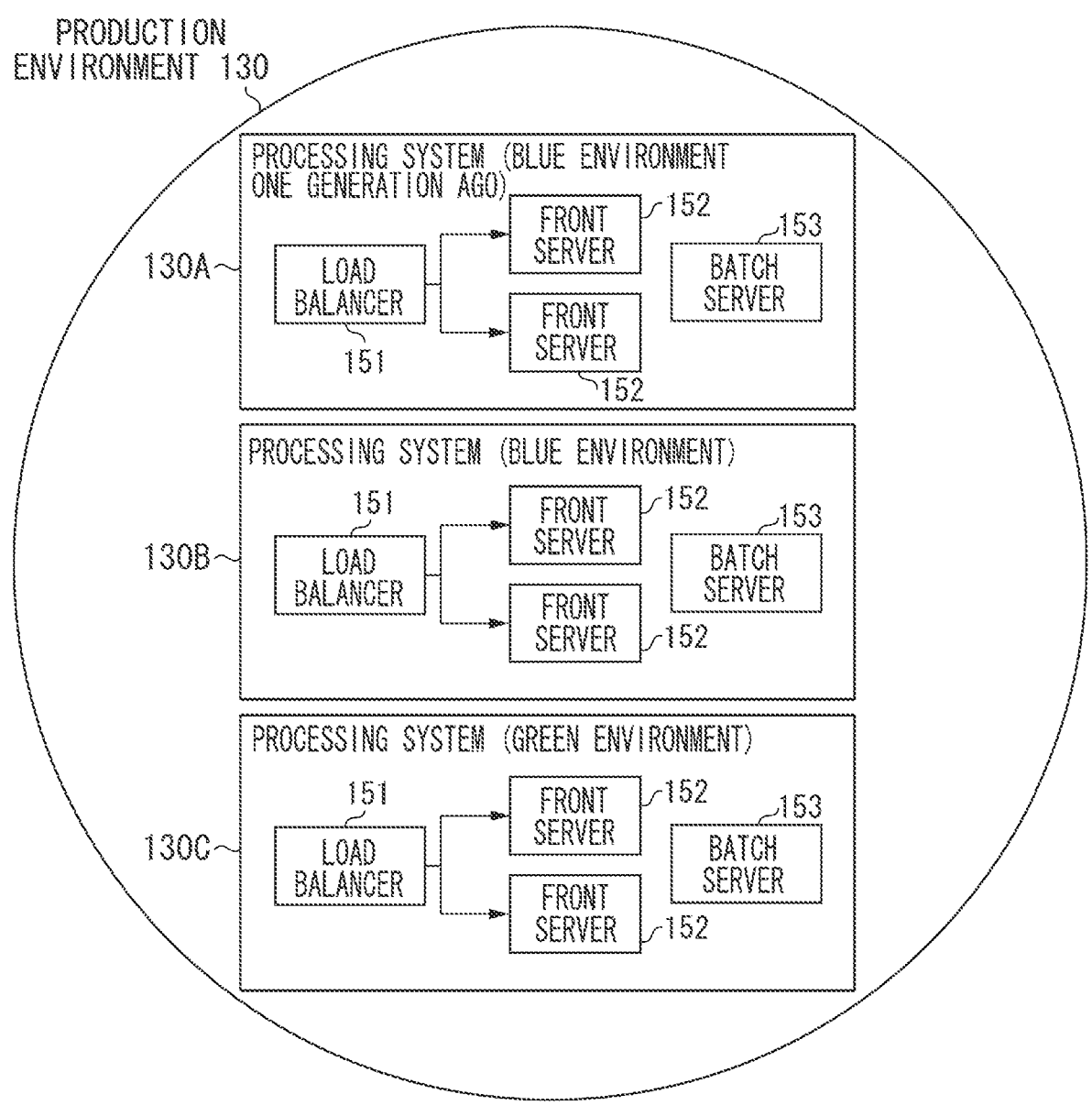
FIGS. 13A and 13B are diagrams illustrating examples of a configuration of a deployment environment according to a third exemplary embodiment.
Figure 13B:
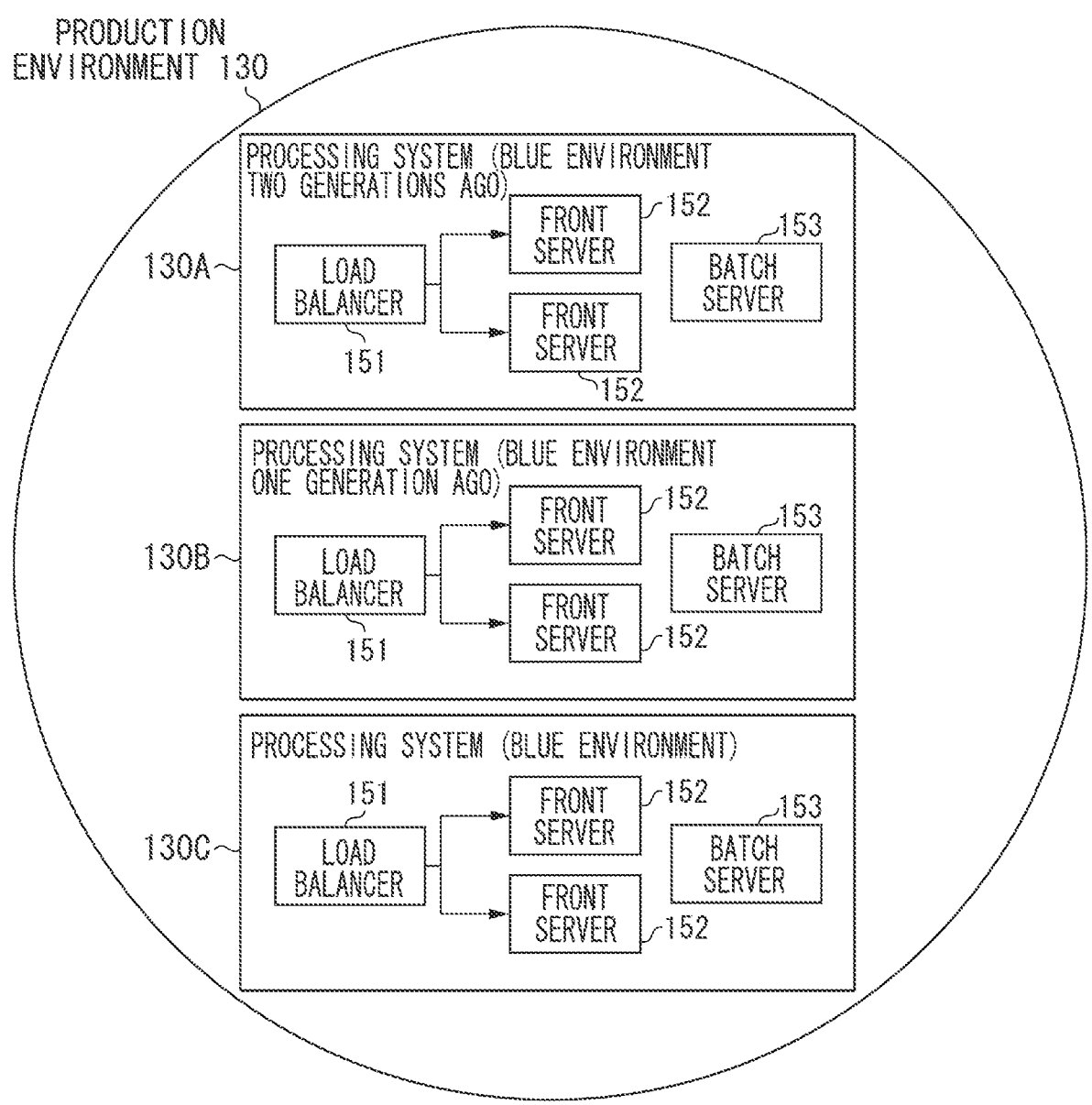

FIGS. 13A and 13B are diagrams illustrating examples of a configuration of a deployment environment according to the present exemplary embodiment. Although FIGS. 13A and 13B illustrate the production environment, not only the production environment but also another deployment environment may be used. Further, a processing system functioning as a blue environment or a green environment is constructed using resources provided for the user by the server computer at least including a CPU, a RAM, and a ROM.

FIG. 13A illustrates the state before a blue-green deployment regarding the processing system 130B and a processing system 130C is executed. In this case, the processing system 130A is a blue environment one generation ago, the processing system 130B is the current blue environment, and the processing system 130C is a green environment.

FIG. 13B illustrates the state after the blue-green deployment regarding the processing system 130B and the processing system 130C is executed. As a result of the blue-green deployment, the processing system 130B is switched to a blue environment one generation ago, and the processing system 130C is switched to the current blue environment. Further, the processing system 130A is switched to a blue environment two generations ago with respect to the current blue environment.

At this time, in the blue-green deployment, the blue environment one generation ago is not immediately deleted, but is stored for a certain time period. If some problem occurs after switching by the blue-green deployment, the current blue environment may be switched back to a blue environment one generation ago. On the other hand, there is no possibility that the current blue environment is switched back to a blue environment two generations ago. Thus, the processing system 130A in FIG. 13B is deleted. In the present exemplary embodiment, according to the deletion of a blue environment two generations ago, a system image file used to deploy the blue environment two generations ago is deleted.

Figure 14:
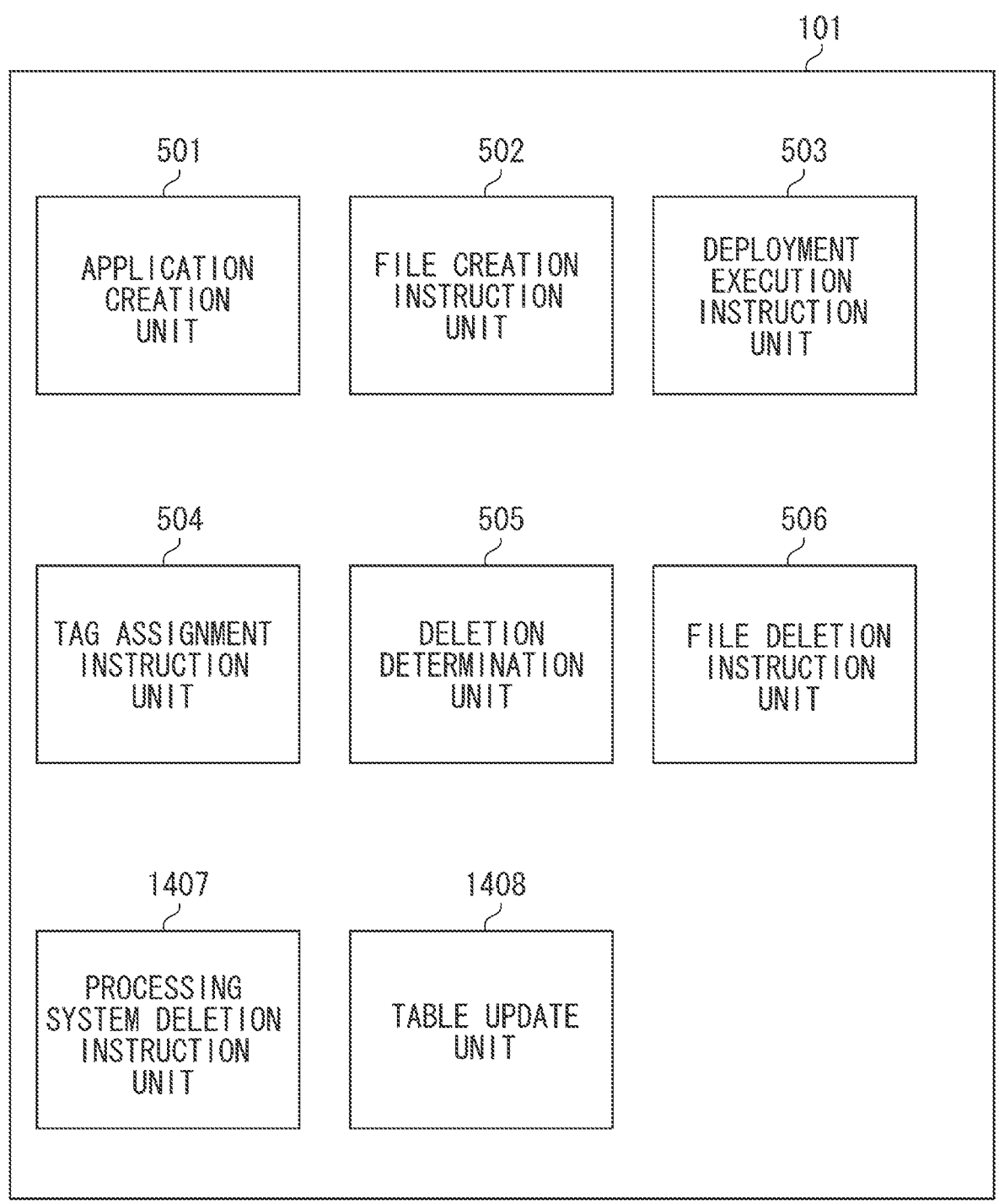
FIG. 14 is a diagram illustrating an example of a configuration of a system manager according to the third exemplary embodiment.

FIG. 14 is a diagram illustrating an example of a configuration of the system manager 101 according to the present exemplary embodiment. The system manager 101 according to the present exemplary embodiment includes a processing system deletion instruction unit 1407 and a table update unit 1408 in addition to the components illustrated in FIG. 5.

The processing system deletion instruction unit 1407 deletes a processing system switched to a blue environment two generations ago. After a blue-green deployment is executed, the table update unit 1408 updates a record in a table for managing the system image file 413, which will be described below with reference to FIG. 15.

FIG. 15 illustrates an example of a management table for the system image file 413. This table is stored in the DB 104. In the table, identifiers of the system image file 413 used for a blue environment and a former blue environment are described with respect to each deployment environment. Each record is updated by the table update unit 1408 and referenced by the deletion determination unit 505.

The deletion determination unit 505 references the values, indicated by records 1511 to 1516, for example, of a system image file 413 that is currently being used. Then, the deletion determination unit 505 determines whether the system image file 413 is to be deleted. In the table illustrated in FIG. 15, information of a system image file used to deploy a blue environment and a system image file used to deploy a blue environment one generation ago is stored. On the other hand, in the table illustrated in FIG. 15, information of a system image file used to deploy a processing system switched to a blue environment two generations ago is not stored. For example, in the table illustrated in FIG. 15, data of a system image file 413 having the identifier "Front-20140401-150000" is not described. Thus, the deletion determination unit 505 can determine that this system image file 413 can be deleted. Meanwhile, in a case where a system image file used to deploy a processing system switched to a blue environment two generations ago is used for a processing system constructed in another deployment environment, information of this system image file is described in the table. Thus, the deletion determination unit 505 can determine that this image file should not be deleted.

For example, after a blue-green deployment is executed in the development environment, the table update unit 1408 performs the following process. First, in the table, the table update unit 1408 describes, in "system image file for former blue environment" corresponding to TR, identifiers described in "system image file for blue environment" corresponding to TR. Then, the table update unit 1408 describes, in "system image file for blue environment" corresponding to TR, identifiers of a system image file 413 used to deploy a blue environment. Consequently, it is possible to manage system image files 413 used for a blue environment and a blue environment one generation older than the blue environment in each deployment environment. A system image file 413 for a blue environment two generations ago that is no longer managed in the table is deleted in a deployment process, which will be described below with reference to FIG. 16.

To system image files used for a blue environment, a blue environment one generation ago, and a blue environment two generations ago, different identifiers may be assigned, and the system image files may be managed as different files. Further, some of a plurality of system image files used for a certain processing system may be the same as system image files used for another processing system.

Figure 16:
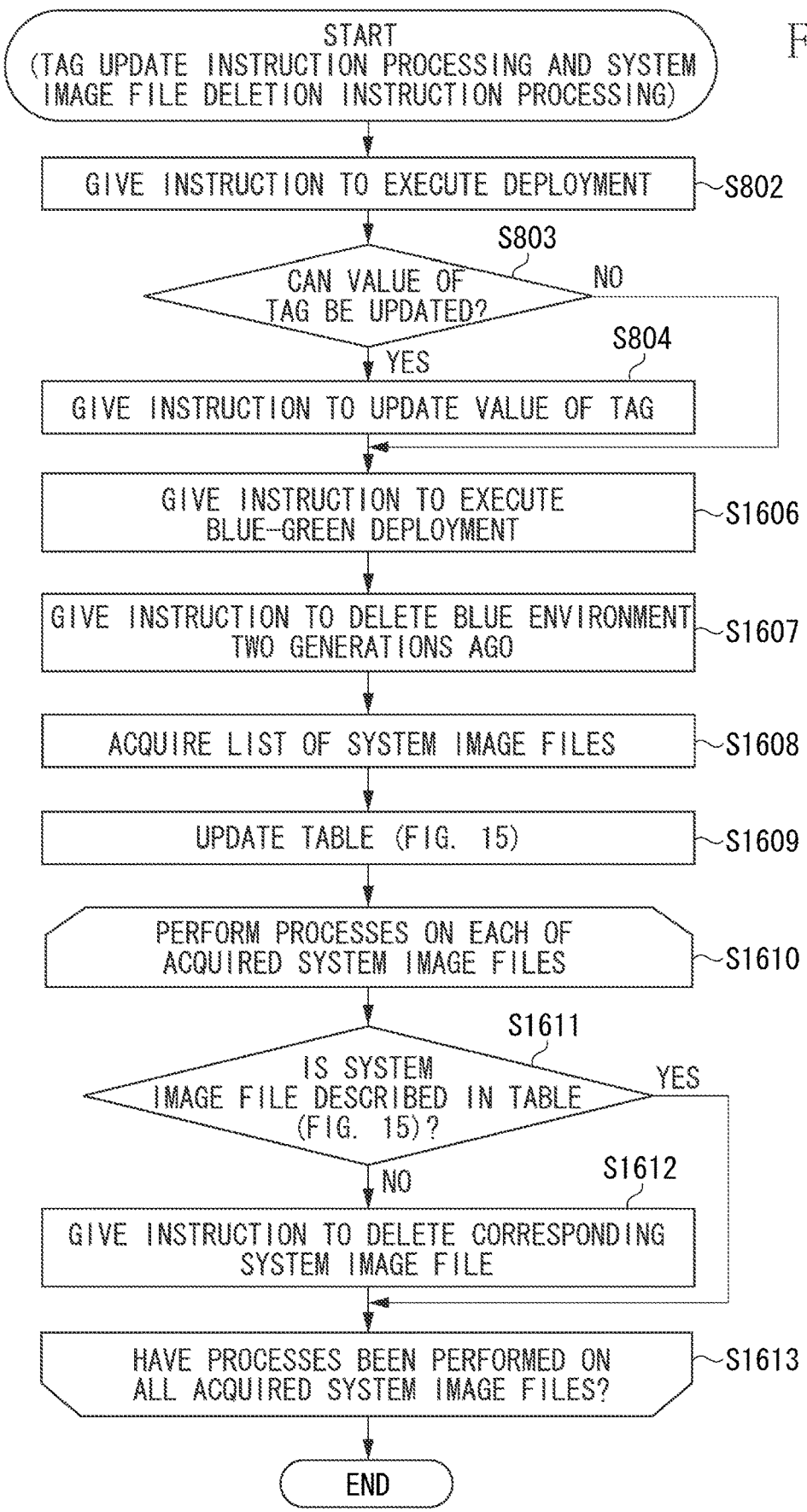
FIG. 16 is a flowchart illustrating an example of a flow of tag update instruction processing and system image file deletion instruction processing according to the third exemplary embodiment.

FIG. 16 is a flowchart illustrating an example of a flow of tag update instruction processing and system image file deletion instruction processing according to the present exemplary embodiment. According to a request from the administrator or at a predetermined time, the system manager 101 executes a deployment process involving the process in which the system manager 101 deletes a system image file 413, which is illustrated in this flowchart. In the present exemplary embodiment, although a description is given taking a deployment process regarding the production environment as an example, the present disclosure is not limited to a deployment regarding the production environment. FIG. 16 is different from FIG. 8 in the first exemplary embodiment in steps S1606 and thereafter. Thus, only these differences are described.

In step S1606, the system manager 101 instructs the service manager 102 to rewrite a DNS record on a DNS server (not illustrated) present in the system 100. According to the reception of a request from a client, the DNS server stores a record indicating the transmission destination of the request as information for responding to the client. Receiving the instruction, the service manager 102 rewrites the DNS record, thereby switching a processing system functioning as a blue environment. Consequently, a green environment deployed based on the instruction in step S802 is switched to a blue environment.

After the blue-green deployment is executed, then in step S1607, the processing system deletion instruction unit 1407 instructs the service manager 102 to delete a processing system switched to a blue environment two generations ago with respect to the current blue environment. In the example of FIG. 13B, the processing system deletion instruction unit 1407 gives an instruction to delete the processing system 130A. Receiving the instruction, the service manager 102 deletes the processing system switched to the blue environment two generations ago.

In step S1608, the file deletion instruction unit 506 acquires a list of system image files 413. The list of system image files 413 acquired at this time at least includes a plurality of system image files corresponding to the blue environment two generations ago for which the deletion instruction is given in step S1607.

Then, in step S1609, the table update unit 1408 updates the record 1516 in the table (FIG. 15). The table update unit 1408 copies the values of "system image file for blue environment" to "system image file for blue environment one generation ago". Then, the table update unit 1408 describes, in "system image file for blue environment", identifiers of the system image file 413 used for the deployment in step S802.

The processes of steps S1610 to S1613 are repeatedly executed on each of the system image files 413 acquired in step S1609. In step S1611, the file deletion instruction unit 506 determines whether the system image file 413 is described in the records 1511 to 1516 in the table (FIG. 15). If the system image file 413 is described in the table, i.e., if the system image file 413 is used for a blue environment or a blue environment one generation ago already constructed in another deployment environment (YES in step S1611), the system image file 413 is not deleted. If the system image file 413 is not described in the table (NO in step S1611), the processing proceeds to step S1612. In step S1612, the file deletion instruction unit 506 instructs the service manager 102 to delete the corresponding system image file 413. In step S1613, if the processes have been performed on all the acquired system image files 413, the processing of this flowchart ends.

In the present exemplary embodiment, a system image file used to deploy a blue environment two generations ago with respect to the current blue environment is deleted by making use of the fact that a blue environment is gradually switched by a blue-green deployment. In the first and second exemplary embodiments, a system image file assigned the tag "PRD" is not deleted. Based on the present exemplary embodiment, however, it is possible to delete a system image file assigned the tag "PRD" after a certain storing period elapses. Further, also in a case where a system image file assigned a tag other than PRD becomes unnecessary, there is a possibility that the system image file can be deleted at an earlier time than the system image file is deleted according to a condition described in the deletion condition table (FIG. 9). In other words, regardless of the value of a tag assigned to a system image file, it is possible to determine whether to delete a system image file less likely to be reused.

In a fourth exemplary embodiment, after a processing system is deployed using a system image file, the operation of the processing system is confirmed, and the subsequent process is varied depending on the result of the confirmation.

FIG. 17 is a flowchart illustrating an example of a flow of tag update instruction processing according to the present exemplary embodiment. The differences from the first exemplary embodiment are mainly described.

After a processing system is deployed using a system image file in step S802, then in step S1703, the operation of the processing system is confirmed. In the operation confirmation, the processing system is accessed using a client computer (not illustrated) present outside the system 100 or a device simulating a client computer, and it is confirmed whether the processing system shows an expected behavior. It is possible that the content of the operation confirmation may differ in each deployment environment. For example, in the development environment, the processing system is evaluated through a simple test by the developer. In the evaluation environment, the processing system is strictly evaluated by a person in charge of quality assurance. Further, in the rehearsal environment, a procedure before a production release is confirmed. In the production environment, a procedure including the provision of a service for an actual user is confirmed.

In step S1704, if a problem is not found in the operation confirmation executed in step S1703 (NO in step S1704), the processing proceeds to step S803. If a problem is found (YES in step S1704), the processing of this flowchart ends. The processes of step S803 and thereafter are similar to those in FIG. 8.

The confirmation of the operation of the processing system in step S1703 may be executed at another time. For example, the operation of the processing system may be confirmed after the tag is updated and before a blue-green deployment is executed.

According to the present exemplary embodiment, in a case where a problem is found in the confirmation of the operation of a processing system, a blue-green deployment is not executed. As described above, it is possible to change the subsequent process depending on the result of the confirmation of the operation of the processing system.

It is possible to combine the above-described first to fourth exemplary embodiments.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-032474, filed Feb. 23, 2016, which is hereby incorporated by reference herein in its entirety.

What is claimed is:

1. A management system for deleting, from a storage that stores a system image file including at least information of software operating on a virtual machine, the system image file, the management system comprising:
   a memory storing instructions; and
   one or more processors executing the instructions causing the management system to:
      manage a plurality of different conditions for a plurality of environments where a processing system including one or more virtual machines started using the system image file can be constructed, respectively;
      perform a request to assign a value of an attribute corresponding to an environment where a processing system including a virtual machine started using a system image file is constructed, to the system image file;
      determine whether the system image file is to be deleted based on a condition managed for the environment according to the value of the attribute assigned to the system image file in response to the performed request; and
      perform a delete request to delete, from the storage, the system image file that has been determined to be deleted,
   wherein the plurality of environments includes a first environment and a second environment,
   wherein a first predetermined time is managed as a condition for the first environment and a second predetermined time is managed as another condition for the second environment,
   wherein, in a case where a time elapsed after a system image file, to which a value of an attribute corresponding to the first environment is assigned, is created exceeds the first predetermined time, it is determined that the system image file is to be deleted,
   wherein, in a case where a time elapsed after a system image file, to which a value of an attribute corresponding to the second environment is assigned, is created exceeds the second predetermined time, it is determined the system image file is to be deleted, and
   wherein the second predetermined time is longer than the first predetermined time, and a difference between the first predetermined time and the second predetermined time is equal to or longer than the first predetermined time.

2. The management system according to claim 1, wherein, in a case where a time elapsed after the system image file is created exceeds a predetermined time corresponding to the value of the attribute assigned to the system image file, it is determined that the system image file is to be deleted.

3. The management system according to claim 1, wherein the instructions further cause the management system to determine, based on the value of the attribute assigned to the system image file, whether the value of the attribute assigned to the system image file can be updated,
   wherein, when a processing system including a virtual machine started using the system image file is constructed, a request is performed to update the value of the attribute of the system image file that has been determined to be able to be updated.

4. The management system according to claim 1, wherein the instructions further cause the management system to determine, based on the value of the attribute assigned to the system image file, whether the system image file can be used when a processing system is constructed,
   wherein a processing system including a virtual machine started using the system image file that has been determined to be able to be used is constructed.

5. The management system according to claim 1, wherein, in an environment where a plurality of processing systems including one or more virtual machines started using one or more system image files are constructed, and in a case where the plurality of constructed processing systems include a first processing system, a second processing system, and a third processing system, when, after a processing system for receiving a request from a client included in a predetermined network system is switched from the first processing system to the second processing system, the processing system for receiving a request from the client is switched from the second processing system to the third processing system, it is determined that the system image file(s) used to start the virtual machine(s) included in the first processing system is to be deleted.

6. The management system according to claim 5, wherein the system image file(s) used to start the virtual machine(s) included in the first processing system, the system image file(s) used to start the virtual machine(s) included in the second processing system, and the system image file(s) used to start the virtual machine(s) included in the third processing system are different from each other.

7. The management system according to claim 5, wherein, in a case where the system image file(s) used to start the virtual machine(s) included in the first processing system is/are not used for a processing system that has already been constructed, it is determined that the system image file(s) is/are to be deleted.

8. The management system according to claim 5, wherein the instructions further cause the management system to perform a switch request to switch the processing systems for receiving a request from the client,
   wherein, in response to the request, a record indicating a request transmission destination stored in a domain name system (DNS) server, which responds to the client according to reception of a request from the client, is rewritten so that the processing systems for receiving a request from the client are switched.

9. The management system according to claim 1,
   wherein a time elapsed after a system image file, to which a value of an attribute corresponding to any environment other than a particular environment among the plurality of environments is assigned, is created exceeds a predetermined time corresponding to the value of the attribute assigned to the system image file, it is determined that the system image file is to be deleted, and
   wherein, among the plurality of environments, in an environment where a first processing system, a second processing system, and a third processing system each including one or more virtual machines started using system image files are constructed, when, after a processing system for receiving a request from a client included in a predetermined network system is switched from the first processing system to the second processing system, the processing system for receiving a request from the client is switched from the second processing system to the third processing system, it is determined that the system image file(s) used to start the virtual machine(s) included in the first processing system are to be deleted, regardless of the value(s) of attribute(s) assigned to the system image file(s).

10. The management system according to claim 1, wherein the instructions further cause the management system to confirm an operation of a processing system including a virtual machine started using a system image file,
   wherein, in a case where a problem is not found in the confirmation of the operation, a request is performed to assign a value of an attribute to the system image file or update the system image file.

11. The management system according to claim 1, wherein a plurality of virtual machines including the virtual machine operates on a single server computer.

12. A control method for controlling a management system for deleting, from a storage that stores a system image file including at least information of software operating on a virtual machine, the system image file, the control method comprising:
   managing a plurality of different conditions for a plurality of environments where a processing system including one or more virtual machines started using the system image file can be constructed, respectively;
   performing a request to assign a value of an attribute corresponding to an environment where a processing system including a virtual machine started using a system image file is constructed, to the system image file;
   determining, as a first determination, whether the system image file is to be deleted based on a condition managed for the environment according to the value of the attribute assigned to the system image file in response to the performed request; and
   performing a delete request to delete, from the storage, the system image file that has been determined to be deleted in the first determination,
   wherein the plurality of environments includes a first environment and a second environment,
   wherein a first predetermined time is managed as a condition for the first environment and a second predetermined time is managed as another condition for the second environment,
   wherein, in a case where a time elapsed after a system image file, to which a value of an attribute corresponding to the first environment is assigned, is created exceeds the first predetermined time, it is determined that the system image file is to be deleted,
   wherein, in a case where a time elapsed after a system image file, to which a value of an attribute corresponding to the second environment is assigned, is created exceeds the second predetermined time, it is determined the system image file is to be deleted, and
   wherein the second predetermined time is longer than the first predetermined time, and a difference between the first predetermined time and the second predetermined time is equal to or longer than the first predetermined time.

13. The control method according to claim 12, wherein, in the first determination, in a case where a time elapsed after the system image file is created exceeds a predetermined time corresponding to the value of the attribute assigned to the system image file, the system image file is determined to be deleted.

14. The management system according to claim 1, wherein the plurality of environments includes at least a development environment and an evaluation environment.

15. The management system according to claim 1, wherein the system image file to which the value of the attribute of a production environment is assigned is determined not to be deleted.

* * * * *